United States Patent [19]

Arnold et al.

[11] 4,312,820

[45] Jan. 26, 1982

[54] PROCESS AND APPARATUS FOR NUCLEATION CONTROL ADAPTED FOR REACTION INJECTION MOLDING OF CELLULAR PRODUCTS

[75] Inventors: John W. Arnold, West Bloomfield; Steven L. Mills, Bloomfield Hills, both of Mich.

[73] Assignee: General Motors Corporation, Detroit, Mich.

[21] Appl. No.: 180,132

[22] Filed: Aug. 21, 1980

[51] Int. Cl.³ .................. B29D 27/00; G01N 7/14
[52] U.S. Cl. .................................... 264/40.1; 73/19; 264/45.3; 264/50; 264/DIG. 83; 425/135
[58] Field of Search .............. 264/50, DIG. 83, 40.1, 264/45.3; 73/19; 425/135

[56] References Cited

U.S. PATENT DOCUMENTS

| | | | |
|---|---|---|---|
| 3,521,478 | 7/1970 | Magorien | 73/19 |
| 3,673,853 | 7/1972 | Griswold et al. | 73/19 |
| 4,050,896 | 9/1977 | Raffel et al. | 73/195 X |
| 4,073,840 | 2/1978 | Saidla | 264/45.3 |
| 4,157,427 | 6/1979 | Ferber | 521/133 |
| 4,236,404 | 12/1980 | Ketchum et al. | 73/19 |

FOREIGN PATENT DOCUMENTS 2543302  2/1979  Fed. Rep. of Germany.

Primary Examiner—Philip Anderson
Attorney, Agent, or Firm—Elizabeth F. Harasek

[57] ABSTRACT

A novel apparatus and method are provided for monitoring gas entrainment in liquid precursors for reaction injection molding (RIM). In accordance with the invention, a nucleated RIM precursor is sampled and the sample subjected to a controlled volumetric change. The measured pressure of the expanded or compressed sample is compared to that corresponding to the ideal degree of gas entrainment. The comparison is used to control the addition or withdrawal of entrained gas.

6 Claims, 1 Drawing Figure

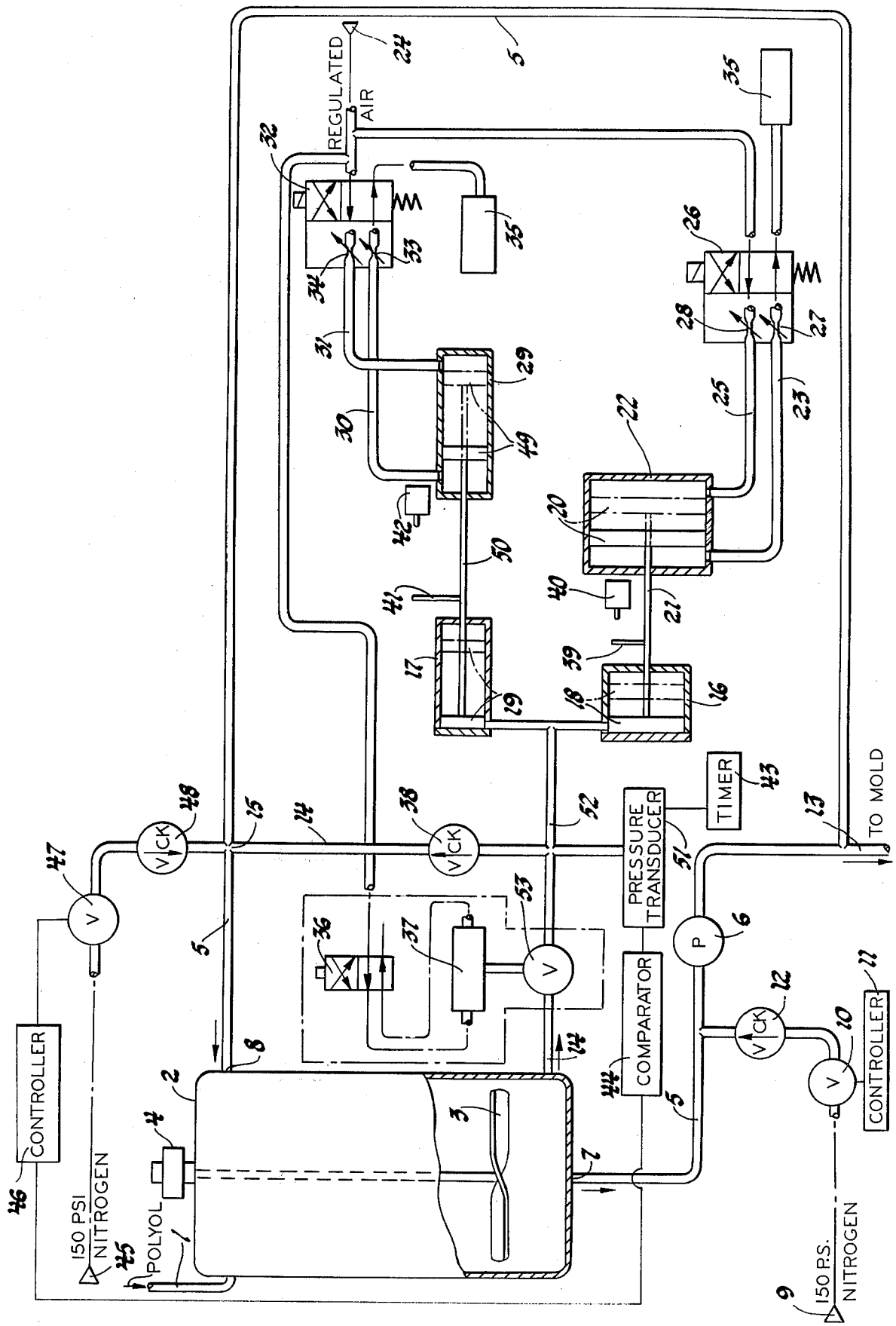

PROCESS AND APPARATUS FOR NUCLEATION CONTROL ADAPTED FOR REACTION INJECTION MOLDING OF CELLULAR PRODUCTS

BACKGROUND OF THE INVENTION

Polymeric articles may be formed by injecting highly chemically reactive liquid constituents into a mold where they polymerize in situ. Before molding, the constituents are nucleated with pressurized gas in the form of minute bubbles. After injection, the gas expands promoting mold fill-out and microcellularity (with resultant reduced density) in the polymerized article.

This invention relates to a method and means for monitoring the degree of gas entrainment in such constituents prior to molding. More particularly, the invention relates to the controlled volumetric expansion of reactive constituent samples to determine the amount of gas actually entrained therein relative to the desired amount.

Reaction injection molding (RIM) generally pertains to injecting highly chemically reactive liquid constituents into a mold wherein they rapidly polymerize to form a desired article. Relatively large, structural automotive parts such as automobile fascia and quarter panels have been formed from reaction injection molded thermosetting urethanes. In urethane RIM systems, a catalyzed stream of liquid polyol is impingement mixed with a stream of isocyanate under high pressure. We have found it expedient to impregnate at least one of the constituents with a pressurized gas. Herein, the process of introducing an agent into a constituent prior to molding which is gaseous and expands in the mold may be referred to as nucleation.

The gas is entrained in the form of minute bubbles introduced, for example, through a microporous diffusion element as taught in U.S. Pat. No. 4,157,427 assigned to the assignee hereof, or by whipping a pressurized gas blanket into a bulk holding tank of constituent. The entrained gas expands as pressure on the constituents is relieved after mold injection. The gas expansion helps fill out the mold, promote uniform part density, and eliminate sink marks in thick mold sections. The urethane parts so produced are dense microcellular foams with smooth, paintable surfaces. For automotive applications, a cured part density of about 90% of the density of the unblown urethane is desirable.

It is often desirable to reinforce RIM articles with fiberglass or other particulate fillers. The fillers are preferably slurried in amounts up to 50 weight percent with agitated precursor constituents. Gas is entrained in the slurries as described above.

In order to predictably and consistently reaction injection mold high quality microcellular parts, it is necessary to know the degree of gas entrained in the precursor constituents prior to molding. One method of doing this has been to periodically monitor the specific gravity of the constituents with a device such as a Dynatrol ®. The specific gravity of a constituent generally decreases in proportion to the amount of gas or blowing agent present. Another means of measuring the amount of entrained gas is set forth in U.S. Pat. No. 4,050,896. In that method, the volumetric flow rate of a gas-charged reaction component is measured at a first pressure level. The component is then brought to a second, lower pressure level and the volumetric flow rate is measured again. The differential flow rate is a function of the amount of entrained gas.

Neither of the above-described methods for measuring the amount of entrained gas, nor any other method of which applicants are aware, is adaptable for use with filled systems. Small variations in the amount of filler present can cause large fluctuations in the specific gravity of the liquid constituent in which they are entrained. Moreover, the relatively sensitive and costly instruments used to measure flow rate and specific gravity may not tolerate the presence of abrasive filler particles. Moreover, these methods are relatively complex compared to the method which is the subject of this invention. While our invention represents the only known practical method and apparatus for measuring gas entrainment in filled RIM systems, it is also applicable to unfilled RIM systems and represents a substantial improvement in the art.

Thus it is an object of this invention to provide an improved method of monitoring gas entrainment in a pressurized liquid precursor constituent for molding polymeric articles, particularly where the precursor constituent contains abrasive filler particles. A more specific object is to provide a method of expanding a sample of a liquid RIM precursor constituent from a first volume to a different second volume, measuring the sample pressure at the second volume and comparing the measured pressure to the pressure corresponding to the desired degree of gas entrainment. A further object of the method is to control the addition or withdrawal of gas to or from a RIM precursor constituent on the basis of the measured pressure of a sample thereof after its controlled volumetric expansion.

Another object is to provide an improved, relatively inexpensive and wear-resistant means of monitoring gas entrainment in a chemically reactive liquid precursor constituent for molding polymeric articles by injecting the constituent into a mold and polymerizing it therein. A more specific object is to provide means for expanding a sample of a RIM precursor constituent containing entrained gas, for measuring the pressure of the expanded sample, and for comparing the measured pressure to the pressure corresponding to the ideal amount of entrained gas in the constituent. Another object is to provide means to use such pressure measurement and comparison to automatically control the addition or withdrawal of gas from the constituent. Another object is to provide a means of monitoring gas entrainment in a particle filled RIM precursor constituent.

BRIEF SUMMARY OF THE INVENTION

In a preferred embodiment, a chemically reactive precursor constituent for a RIM system is inoculated with minute bubbles of gas while retained in a pressurized holding vessel. Periodically, a sample of the constituent is withdrawn from the vessel and expanded in a controlled manner from a first volume to a greater second volume. The pressure of the expanded sample is measured at the second volume and compared to the pressure corresponding to the ideal pressure for a like sample measured in like manner to achieve the desired degree of gas entrainment for the particular molding operation. The pressure measurement comparison is used to control the additional entrainment or withdrawal of gas from the constituent.

DETAILED DESCRIPTION OF THE INVENTION

Our invention will be better understood in view of the following detailed description and figure which shows a diagrammatic view of an apparatus suitable for the practice of the invention.

The FIGURE shows the holding and nucleating portions of the polyol side of a RIM system for molding urethane parts. Like equipment (not shown) is provided for the isocyanate constituent. The polyol and isocyanate components are impingement mixed and injected into a mold (not shown) to make a part. The figure shows a set up particularly adapted for processing particle filled polyol.

The liquid polyol is delivered through inlet 1 into pressurized, jacketed tank 2 and mixed with up to 50 weight percent of a filler such as 1/16 inch milled glass fibers. The material in tank 2 is continuously agitated by stirrer 3 driven by motor 4 or other suitable means. A first recirculation line 5 is provided incorporating pump 6 for continuously recirculating the constituent from outlet 7 at the bottom of tank 2 to inlet 8 near the top, the flow being in the direction indicated by the arrows. A first source 9 of nitrogen, at a pressure higher than tank pressure, is provided for initially rapidly introducing nitrogen into the filled polyol. The nitrogen is delivered through valve 10 actuated by controller means 11. A check valve 12 is provided between nitrogen source 9 and recirculation line 5 to prevent any backflow of the polyol constituent into nitrogen source 9. Polyol may be withdrawn from the recirculation line at 13 for delivery to one inlet port of a high pressure impingement mixing head (not shown) where it is combined with the isocyanate constituent preparatory to injection into a mold (not shown). After polyol and filler are introduced to tank 2, stirrer 3 is activated and nitrogen from source 9 is rapidly diffused into the polyol through valve 10.

The amount of gas that is actually entrained in the polyol-glass slurry in tank 2 at any particular time is determined in a second recirculation line 14 in parallel with line 5, outletting into line 5 at junction 15. Line 14 is adapted for withdrawing a relatively small sample of polyol from the bulk in tank 2 and testing it for gas entrainment.

Sampling recirculation line 14 contains a sampling cylinder 16 and a decompression cylinder 17. Sampling piston 18 and decompression piston 19 are reciprocatably, slidably retained in cylinders 16 and 17 respectively. Sampling piston 18 is attached to drive piston 20 by connecting rod 21. Piston 18 is actuated by drive piston 20 housed in hydraulic cylinder 22. Positive air pressure in line 23 from regulated air source 24 causes piston 20 itself to retract as well as sampling piston 18. Positive air pressure in line 25 from source 24 causes piston 20 itself to move forward as well as sampling piston 18. The flow of regulated air in lines 23 and 25 is controlled by solenoid actuated valve 26 and flow regulators 27 and 28. In like manner, decompression piston 19 is attached to decompression drive piston 49 by connecting rod 50. Piston 19 is actuated by drive piston 49 housed in hydraulic cylinder 29. Positive air pressure in line 30 from regulated air source 24 causes piston 49 itself to retract as well as decompression cylinder piston 19. Positive air pressure in line 31 causes piston 49 itself to move forward as well as decompression piston 19. The flow of regulated air in lines 30 and 31 is controlled by solenoid actuated valve 32 and flow regulators 33 and 34. Mufflers 35 are attached to air lines 23 and 30 to muffle noise from pneumatic valve operations.

Sample cylinder 16 and decompression cylinder 17 are in fluid circuit with pressure transducer 51 by conduit 52 which is a portion of line 14. Transducer 51 measures the gage pressure in conduit 52. Pressure transducer 51, sample cylinder 16, and decompression cylinder 17 are isoldated from tank 2 by closing ball valve 53 operated by means of solenoid actuated valve 36 which controls pneumatic air valve actuator 37. A check valve 38 is provided in the return portion of line 14, downstream of pressure transducer 51, to prevent backflow of polyol into the sampling cylinder 16 and decompression cylinder 17 during the pressure measuring portion of the cycle.

Measurement of gas entrainment in a polyol-glass slurry in tank 2 is made as follows:

Sample cylinder piston 18 and decompression cylinder piston 19 are moved in the full forward or closed position (shown in solid lines) by activating solenoid actuated valves 26 and 32 to allow regulated pressurized air to flow through regulators 28 and 34 into lines 25 and 31, respectively. Solenoid 26 is then switched, which cuts off positive air pressure in line 25 and inducts it in line 23. The sample cylinder drive piston 20 retracts (as shown in broken lines), withdrawing sampling piston 18 in sampling cylinder 16 to the open position and causing polyol to flow through ball valve 53 (now in the open position) into cylinder 16. When stop 39 carried on rod 21 hits limit switch 40, ball valve 53 closes and solenoid actuated valve 32 switches. Positive air pressure is transferred from line 31 to line 30 causing retraction of drive piston 49 and decompression piston 19. Decompression piston 19 is retracted to the cylinder open position until stop 41 carried on rod 50 hits limit switch 42 activating timer 43. Before retraction of decompression piston 19 in cylinder 17, the pressure of the polyol in sample cylinder 16 is substantially tank pressure. Retracting decompression cylinder piston 19 increases the effective volume initially occupied by the polyol. The polyol slurry containing pressurized entrained gas expands into the increased volume, decreasing the sample pressure in conduit 52. This decreased pressure is less than tank pressure so that check valve 38 is closed. The pressure in conduit 52 measured by pressure transducer 51 is noted at a fixed time after decompression as clocked by timer 43. The measured pressure is compared to the ideal pressure at comparator 44. The ideal pressure is the pressure of a like sample measured in like manner of a precursor constituent in which the precise amount of gas is entrained which produces the desired results in a molding made therefrom. The ideal pressure would usually be determined empirically for a particular constituent at a particular filler level. While the degree of gas entrainment has been described in terms of the controlled expansion of a sample, it will be appreciated that the sample could be compressed instead. The sample compression would be accomplished by effectively decreasing its initial volume by means of a piston in the sampling chamber or other equivalent. Means would be provided to measure the pressure of the compressed sample at a fixed time after compression.

If the measured pressure of the sample is lower than the ideal, more gas is entrained in the liquid from secondary nitrogen source 45. If the pressure is too high, the degree of gas entrainment is reduced by, e.g., adding additional constituent to the system through inlet 1, slowing agitator 3, or venting tank 2. Controller 46 coupled with comparator 44 controls the flow of nitrogen from secondary source 45 through valve 47 to slowly increase gas entrainment in the recirculating polyol. Check valve 48 prevents backflow of polyol into secondary nitrogen source 45.

Once the gas measurement sampling cycle is complete, the sample cylinder piston 18 and decompression cylinder piston 19 are returned to the full forward position, forcing the expanded polyol sample through check valve 38 into recirculation line 14 which empties into line 5 at junction 15. Thereafter, the cycle is repeated periodically as required.

In a typical system for molding fiberglass reinforced automotive quarter panels using an apparatus of the type shown in the figure, a mixture of polyether polyol and ethylene glycol was introduced into a stirred 75 gallon tank. The mixture was filled with amounts up to 45 weight percent 1/16 inch glass fiber during various runs. Nitrogen at about 100 psi was introduced into the polyol in a recirculation line through a perforated steel tube. The tank was blanketed with nigrogen at a pressure of about 40–50 psi (tank pressure). Polyol was withdrawn from the recirculation line as needed for molding. A second parallel recirculation line was provided containing a sampling cylinder with a reciprocatable piston having a 4 inch diameter bore and a 4 inch stroke. A sample was periodically withdrawn from the tank into the sample cylinder by retracting the piston. The sample, as taken, was substantially at tank pressure. The sample cylinder was then closed off from the remainder of the system and its effective volume was thereafter increased by retracting a decompression piston slidably retained in a second cylinder. The decompression cylinder had a bore of 1.5 inches and the piston was retracted 2.5 inches. The pressure immediately after the decompression cylinder was retracted was measured to be less than ten psi by a pressure transducer. Sixty seconds after decompression, the pressure was again read and was approximately 20 psi. This pressure was compared with the ideal pressure for the particular molding run. If the sample pressure was lower than ideal, nucleating gas was added to the polyol. Additional polyol was added when the measured sample pressure was too high.

During production RIM, fully nucleated constituents are intermittently withdrawn from holding tanks as parts are molded. As unnucleated constituent is added, it is necessary to introduce additional entrained gas. The apparatus and method which are the subject of this invention make this process efficient and effective. The method is not dependent on expensive and delicate flow rate or specific gravity measuring equipment and it does not interfere with the molding cycle in any way. Moreover, the apparatus and method are adaptable to filled and unfilled systems alike.

While our invention has been described in terms of a specific embodiment thereof, other forms may readily be adapted by one skilled in the art. Therefore, our invention is to be limited only by the following claims.

The embodiments of the invention in which an exclusive property or privilege is claimed are defined as follows:

1. In a method of molding a polymeric article by the polymerization reaction of a liquid constituent in a mold, wherein said method pressurized gas is entrained in said liquid constituent prior to molding, the improvement comprising monitoring said gas entrainment in said constituent by
   taking a sample thereof, changing the volume of said sample from a first volume to a different second volume;
   measuring the sample pressure at said second volume;
   comparing said measured pressure to the pressure corresponding to the desired amount of entrained gas in a like sample of said constituent processed in like manner; and
   using said comparison to control the addition or withdrawal of gas from said constituent.

2. A method of controlling the entrainment of gas in a viscous liquid precursor constituent for a molded cellular polymeric article, the method comprising the steps of
   withdrawing a sample of said constituent of a first predetermined volume from said bulk;
   changing the volume of the sample to a different second volume;
   measuring the pressure of the sample at said second volume;
   comparing the measured sample pressure to the pressure corresponding to a desired amount of entrained gas in a like sample of the constituent measured in like manner; and
   adding or withdrawing gas from said constituent on the basis of said comparison.

3. A method of controlling the nucleation of a liquid precursor constituent for a reaction injection molded polymer, a bulk of said nucleated constituent being retained under pressure prior to molding, comprising:
   withdrawing a relatively small sample of the bulk constituent into a variable volume chamber;
   changing the volume of the chamber from a first volume to a different second volume;
   retaining said sample at said second volume for a predetermined time after said volume change;
   measuring the pressure of the sample at said time;
   comparing the measured sample pressure to the pressure corresponding to the desired amount of entrained gas in a like sample measured in like manner; and
   entraining or withdrawing gas from the constituent bulk on the basis of said comparison.

4. In an apparatus for molding polymeric articles by the injection and polymerization of a liquid chemical constituent containing entrained gas in a mold, said apparatus comprising a vessel for retaining a bulk of said constituent under pressure prior to molding and means for dispensing gas into said bulk constituent, the improvement comprising means for receiving a sample of known first volume from said bulk; means for changing the volume of said sample constituent from said first volume to a different second volume; means for measuring the pressure of said constituent sample at said second volume; and means for controlling the addition or withdrawal of gas from the bulk of said constituent on the basis of said measurement.

5. In combination with means for forming polymeric articles by the reaction injection molding of a nucleated liquid chemical precursor constituent means cooperative therewith for monitoring the degree of nucleation comprising means for changing the volume of a sample of said constituent from a first predetermined volume to a second predetermined volume; means for measuring the sample pressure at said second volume after a fixed time; and means for increasing or decreasing constituent nucleation based on the measured pressure of the sample.

6. An apparatus for monitoring gas entrainment in a bulk of liquid precursor constituent for reaction injection molding comprising
 means for withdrawing a sample of said constituent from said bulk and isolating it therefrom;
 a chamber for retaining said sample;
 means cooperative with the chamber for changing the effective volume of said sample;
 means for measuring the elapsed time after a said sample volume change;
 means for measuring the pressure of the sample in the chamber at a said elapsed time;
 means for comparing said measured pressure to a predetermined pressure corresponding to a desired gas entrainment in the constituent; and
 means for adding or withdrawing gas to the constituent bulk on the basis of the output of said comparison means.

* * * * *